US011551182B2

(12) United States Patent
Newell et al.

(10) Patent No.: US 11,551,182 B2
(45) Date of Patent: Jan. 10, 2023

(54) SYSTEMS AND METHODS FOR AI-BASED DETECTION OF DELAYS IN A SHIPPING NETWORK

(71) Applicant: CONVEY, LLC, Austin, TX (US)

(72) Inventors: John Coleman Newell, Austin, TX (US); Samuel Thomas Weston Butler, Austin, TX (US); Anna Leigh Bourland, Austin, TX (US); Sebastian Kuruvilla Karivelithara, Austin, TX (US)

(73) Assignee: CONVEY, LLC, Austin, TX (US)

( * ) Notice: Subject to any disclaimer, the term of this patent is extended or adjusted under 35 U.S.C. 154(b) by 0 days.

(21) Appl. No.: 17/028,852

(22) Filed: Sep. 22, 2020

(65) Prior Publication Data
US 2022/0092530 A1     Mar. 24, 2022

(51) Int. Cl.
*G06Q 10/08*     (2012.01)
*G06N 20/00*     (2019.01)

(52) U.S. Cl.
CPC ......... *G06Q 10/0833* (2013.01); *G06N 20/00* (2019.01); *G06Q 10/0835* (2013.01); *G06Q 10/0838* (2013.01)

(58) Field of Classification Search
CPC ........... G06Q 10/0833; G06Q 10/0838; G06Q 10/0835; G06N 20/00
See application file for complete search history.

(56) References Cited

U.S. PATENT DOCUMENTS

| 2018/0357736 | A1* | 12/2018 | Sun .................. G06Q 50/30 |
| 2019/0213538 | A1  | 7/2019  | Bebout et al. |
| 2020/0118071 | A1* | 4/2020  | Venkatesan ........ G06Q 10/0833 |
| 2020/0134545 | A1* | 4/2020  | Appel .................... G06Q 10/04 |
| 2020/0342398 | A1* | 10/2020 | Aggarwal ............. G06N 5/046 |
| 2020/0410441 | A1  | 12/2020 | Bourland et al. |

OTHER PUBLICATIONS

Aurangabadkar, Sumedha, Support Vector Machine Based Classification System for Classification of Sport Articles, IEEE, Apr. 3, 2014 (Year: 2014).*
Andreas Balster, An ETA Prediction Model for Intermodal Transport Networks Based on Machine Learning, May 11, 2020, Springer (Year: 2020).*
International Application No. PCT/US2021/051450, International Search Report and Written Opinion, dated Oct. 26, 2021.

* cited by examiner

*Primary Examiner* — Resha Desai
*Assistant Examiner* — Ismail A Manejwala
(74) *Attorney, Agent, or Firm* — Marshall, Gerstein & Borun LLP

(57) ABSTRACT

Embodiments provide systems, methods and computer program products for artificial intelligence-based detection of delays in a shipping network that include training a machine learning model using a training set of in-flight snapshots to infer, based on a set of predictive features, whether a shipment having an estimated delivery dates will meet the estimated delivery date. The machine learning model represents a set of shipment statuses, a set of timings relative estimated delivery dates, and a set of shipment outcomes of the plurality of historical shipments.

14 Claims, 12 Drawing Sheets

```
{
  "result" : [ {
    "shipment" : {
      "account_id" : "206",          ⟵ 208
      "role" : "shipper",            ⟵ 210        ⟵ 250
      "status" : "in_transit",
      "shipment_source" : "pf_order_feed",
      "origin" : {
        "contact" : { },
        "address" : { },             ⟵ 212
        "company_name" : null,
        "dock_close_time" : null
      },
      "destination" : {
        "contact" : { },
        "address" : {
          "city" : "Austin",
          "postal_code" : "78701",        ⟩ 214
          "state_or_province_code" : "TX",
          "country_code" : "US"
        },
        "company_name" : " ",
        "dock_close_time" : null
      },
      "accessorials" : { },          ⟵ 252
      "exception" : false,
      "shipment_identifiers" : [ {
        "type" : "CARRIER_PRO",
        "value" : "0123456789"       ⟵ 204
      }, {
        "type" : "REFERENCE",
        "value" : "0123456789"
      } ],
      "dates" : {                                          ⟵ 244
        "estimated_delivery_date" : "2020-04-07T12:00:00Z",
        "original_estimated_delivery_date" : "2020-04-07T12:00:00Z",   ⟵ 240
        "ship_date" : "2020-04-06T00:00:00Z",   ⟵ 246
        "promised_delivery_date" : "2020-04-14",       242
        "order_date" : "2020-04-01"     ⟵ 245    248
      },
      "carrier_id" : "130",          ⟵ 220
      "quoted_weight" : 3.1,         ⟵ 226
      "actual_weight" : 3.1,         ⟵ 228
      "tracking_owner" : " ",
      "gift" : false,
      "carrier_service_level" : "Expedited Parcels",   ⟵ 224
      "delivery_appointment" : { },
      "delivery_scheduling" : {                  ⟵ 258
        "appointment_required" : false,           ⟩ 254
  256   "scheduling_available" : false
      },
```

*FIG. 2A*

```
"alternative_delivery_location" : {                                    ┌─200
    "contact" : { },
    "address" : { },
    "company_name" : null,
    "dock_close_time" : null
},
"account_brand" : " ",
"custom_tags" : {
    "segment" : "Standard"
},                        ───202
"id" : 368417519,
"resource_id" : "19724ea3-7222-4f6a-924e-e257fe311b48",
"created_date_time" : "2020-04-05T11:01:26.748232Z",
"modified_date_time" : "2020-04-06T19:54:47.542452Z"
},
"shipment_events" : [ {
    "shipment_id" : 368417519,                                      ───264
    "shipment_resource_id" : "19724ea3-7222-4f6a-924e-e257fe311b48",
    "source" : "pf_tracking",
    "timestamp_info" : {
        "local_date" : "2020-04-06",   ◄───280
        "local_time" : "13:45:43"
    },
    "id" : 3664368660,───262
    "created_date_time" : "2020-04-06T18:54:31.319753Z",───266
    "modified_date_time" : "2020-04-06T18:54:31.319753Z",───268
    "status" : "T",──── 274                                                    ├─260
    "status_desc" : "Electronic information submitted by shipper",───276
    "carrier_status" : "3000",───270
    "carrier_status_desc" : "Electronic information submitted by shipper",───272
    "is_exception" : false, ───284
    "status_local_date_time" : "2020-04-06T13:45:43",───278
    "mapping_status_desc" : "Electronic information submitted by shipper",
    "is_mapping_status_desc_set" : true,
    "visible_to_customer" : true
},
```

FIG. 2B

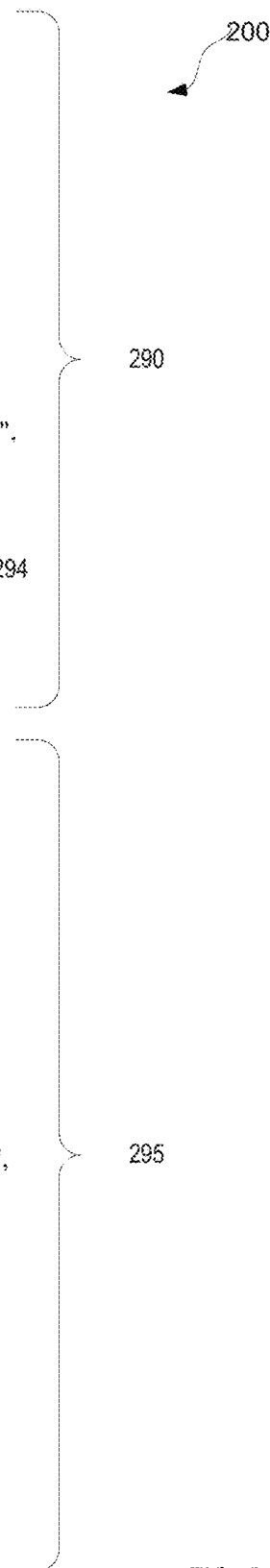

```
{
  "shipment_id" : 368417519,
  "shipment_resource_id" : "19724ea3-7222-4f6a-924e-e257fe311b48",
  "source" : "pf_tracking",
  "timestamp_info" : {
    "local_date" : "2020-04-06",
    "local_time" : "15:49:33",
    "zone_offset" : "-05:00"
  },
  "id" : 3664702553,
  "created_date_time" : "2020-04-06T19:54:47.555142Z",
  "modified_date_time" : "2020-04-06T19:54:47.555142Z",
  "status" : "T",
  "status_desc" : "Item has been picked up and is enroute to the sortation plant",
  "carrier_status" : "2300",
  "carrier_status_desc" : "Shipment picked up by Canada Post",
  "is_exception" : false,
  "city" : "Mississauga",
  "state_or_province_code" : "ON",
  "status_local_date_time" : "2020-04-06T15:49:33",
  "mapping_status_desc" : "Shipment picked up by Canada Post",
  "is_mapping_status_desc_set" : true,
  "visible_to_customer" : true
}, {
  "shipment_id" : 368417519,
  "shipment_resource_id" : "19724ea3-7222-4f6a-924e-e257fe311b48",
  "source" : "pf_tracking",
  "timestamp_info" : {
    "local_date" : "2020-04-06",
    "local_time" : "16:40:55",
    "zone_offset" : "-05:00"
  },
  "id" : 3665019421,
  "created_date_time" : "2020-04-06T20:55:16.843653Z",
  "modified_date_time" : "2020-04-06T20:55:16.843653Z",
  "status" : "T",
  "status_desc" : "Shipment information received at originating postal facility",
  "carrier_status" : "PR01_RECEIVED",
  "carrier_status_desc" : "Shipment received at originating postal facility",
  "is_exception" : false,
  "city" : "Mississauga",
  "state_or_province_code" : "ON",
  "status_local_date_time" : "2020-04-06T16:40:55",
  "mapping_status_desc" : "Shipment received at originating postal facility",
  "is_mapping_status_desc_set" : true,
  "visible_to_customer" : true
} ]
} ]
}
```

FIG. 2C

```
                                                            ← 400
         ┌{'carrier_id__130': 1.0,
  402 ─┘  'time_until_next': 14.0641620244448,─── 410
         ─'carrier_service_level': 'Ground',
  406 ─   'city2': 'Other',
          'time': 'Late'
  414 ─── 'weekday': 'Monday'
  404 ─── 'actual_weight': 3.1,
          'time_until_edd': 19.318055555556,
  408 ─   'status': 'T'
  420 ─── 'carrier_status': PU,
          'same_state': 1, ─────────
          'time_until_promise_date': 140.0, 422
          'edd_to_promise_date': 140.0}
                                        ╲432   ╲430
```

FIG. 4

SYSTEMS AND METHODS FOR AI-BASED DETECTION OF DELAYS IN A SHIPPING NETWORK

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

Embodiments relate to supply chain logistics and ML. More particularly, the present disclosure relates to an artificial intelligence system to detect delays in a shipping network. Even more particularly, some embodiments relate to artificial intelligence systems to detect delays in final mile shipping networks.

BACKGROUND

Carriers of goods often provide computer-based tracking systems to allow consignees and recipients to track shipments. In some cases, the carrier systems assign shipments an estimated delivery date (EDD), which sets an expectation of arrival time for the consignee, or the recipient. For shipments in a supply chain, having an accurate EDD can be critical to efficient operation of downstream processes, such as just-in-time (JIT) manufacturing processes. For consumer goods, having an accurate EDD can allow a shipper to appropriately set customer expectations, thus increasing customer satisfaction.

Over fifteen percent of shipments arrive after the originally assigned EDD. If the carrier detects a material change to the expected timing of this shipment, that carrier may update the EDD. However, approximately half of these affected shipments (~7.5%) do not receive an updated EDD until after the original EDD has passed or until the shipment is delivered late. In these cases, the recipient will be unaware of the delay, which can have a variety of consequences, from customer dissatisfaction to supply chain disruption.

Therefore, what is desired are systems and methods to accurately detect delays in a shipping network. Even more particularly, what is desired are systems and methods to accurately detect delays across heterogeneous outsourced carriers.

SUMMARY

Embodiments described herein provide artificial intelligence-based systems and methods to detect delays in a shipping network. Even more particularly, embodiments employ artificial intelligence to detect shipping delays across heterogenous carriers. Embodiments address issues presented by carrier systems that fail to accurately signal when a shipment is delayed past its EDD by using a combination of features to robustly detect shipping delays. Embodiments use a training set of shipping data (e.g., collected for shipments across carriers) to train a machine learning (ML) model. This training set may be developed by applying transformations on an acquired set of shipping data. The ML model is then trained with this training set. The trained ML model may be applied to newly acquired and transformed shipping data to predict if a delay will occur.

According to one embodiment, ML models are trained to detect whether a shipment will miss its estimated delivery date (EDD) using in-flight snapshots of historical shipments and the eventual outcomes of those shipments. The input features used to train an ML model may include data about the status of a shipment based on information from the carrier tracking services. A shipping management system can monitor in-progress shipments and assign them a risk score periodically based on the inference of the ML model. According to one embodiment, when the risk score exceeds a certain threshold, the shipment is identified as one predicted to miss its EDD.

According to one embodiment, ML models are trained to detect whether a shipment will miss its promise date using in-flight snapshots of historical shipments and the eventual outcomes of those shipments. The input features used to train an ML model may include data about the status of a shipment based on information from the carrier tracking services. A shipping management system can monitor in-progress shipments and assign them a risk score periodically based on the inference of the ML model. According to one embodiment, when the risk score exceeds a certain threshold, the shipment is identified as one predicted to miss its promise date.

Embodiments include computer systems, computer-implemented methods and computer program products for training or using ML models to detect delays. One embodiment includes a computer program product comprising a non-transitory, computer-readable medium storing thereon a set of computer-executable instructions. The set of computer-executable instructions can include instructions for collecting a set of records representing a plurality of historical shipments, each historical shipment in the plurality of historical shipments having a historical shipment estimated delivery date and a historical shipment actual delivery date; creating a training set of in-flight snapshots for the plurality of historical shipments; and training an ML model using the training set of in-flight snapshots to infer, based on a set of predictive features, whether shipments having associated estimated delivery dates will meet the associated estimated delivery dates. According to one embodiment, the ML model represents a set of shipment statuses, a set of timings relative to estimated delivery dates, and a set of shipment outcomes of the plurality of historical shipments.

One embodiment can further include instructions for tracking shipment information for an in-progress shipment, where the shipment information comprises status information and an associated estimated delivery date for the in-progress shipment. The shipment information for the in-progress shipment is transformed into the set of predictive features representing, for example, a current status of the in-progress shipment and a time to the associated estimated delivery date for the in-progress shipment. The ML model can be executed on the set of predictive features for the in-progress shipment to output an inference for the in-progress shipment. The inference may classify the shipment as, for example, "on-time" (the shipment is predicted to meet its estimated delivery date) or "delayed" (the shipment is predicted not to meet its estimated delivery date). In some embodiments, the model outputs a raw probability score that a shipment fits a particular class. The probability score may be used to identify shipments that are at risk of missing their EDDs. The probability that a shipment is "delayed" may be referred to as a delay risk score. The shipment information and the delay risk score for the in-progress shipment can be stored in a database indexed for a web application. According to one embodiment, the in-progress shipment is determined to be at risk of missing its estimated delivery date if the delay risk score exceeds a threshold.

The set of predictive features may comprise a variety of features including, but not limited to, features representing statuses, status relationships, status timings, the carrier, physical information for the shipment, or any other information about an in-progress shipment. According to one embodiment, the set of predictive features includes one or more timestamp dependent features. Examples of input features include, but are not limited to: carrier, service level, time since the last tracking event, type of last tracking event, time of day of last tracking event, day of week of last tracking event, time remaining to the current EDD, package weight, location of the last tracking event, distance from the last known location to the destination.

Embodiments can provide more timely detection of delays, such that they are known before the estimated delivery date has passed.

Some embodiments provide an advantage by using an ML model trained on in-flight snapshots of historical shipments. Training on snapshots can allow for a lack of tracking events to be captured in the training data.

Some embodiments may incorporate feature engineering that captures signals from timestamp dependent data points.

Timing and relationship between tracking event occurrence and event discovery in data can be based on a historical dataset spanning a large number (e.g., hundreds) of carriers with unique tracking data connection characteristics.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2A, FIG. 2B and FIG. 2C illustrate one embodiment of a set of shipment information for a shipment;

FIG. 4 illustrates one embodiment of a set of predictive features for a shipment;

DETAILED DESCRIPTION

Figure 1:
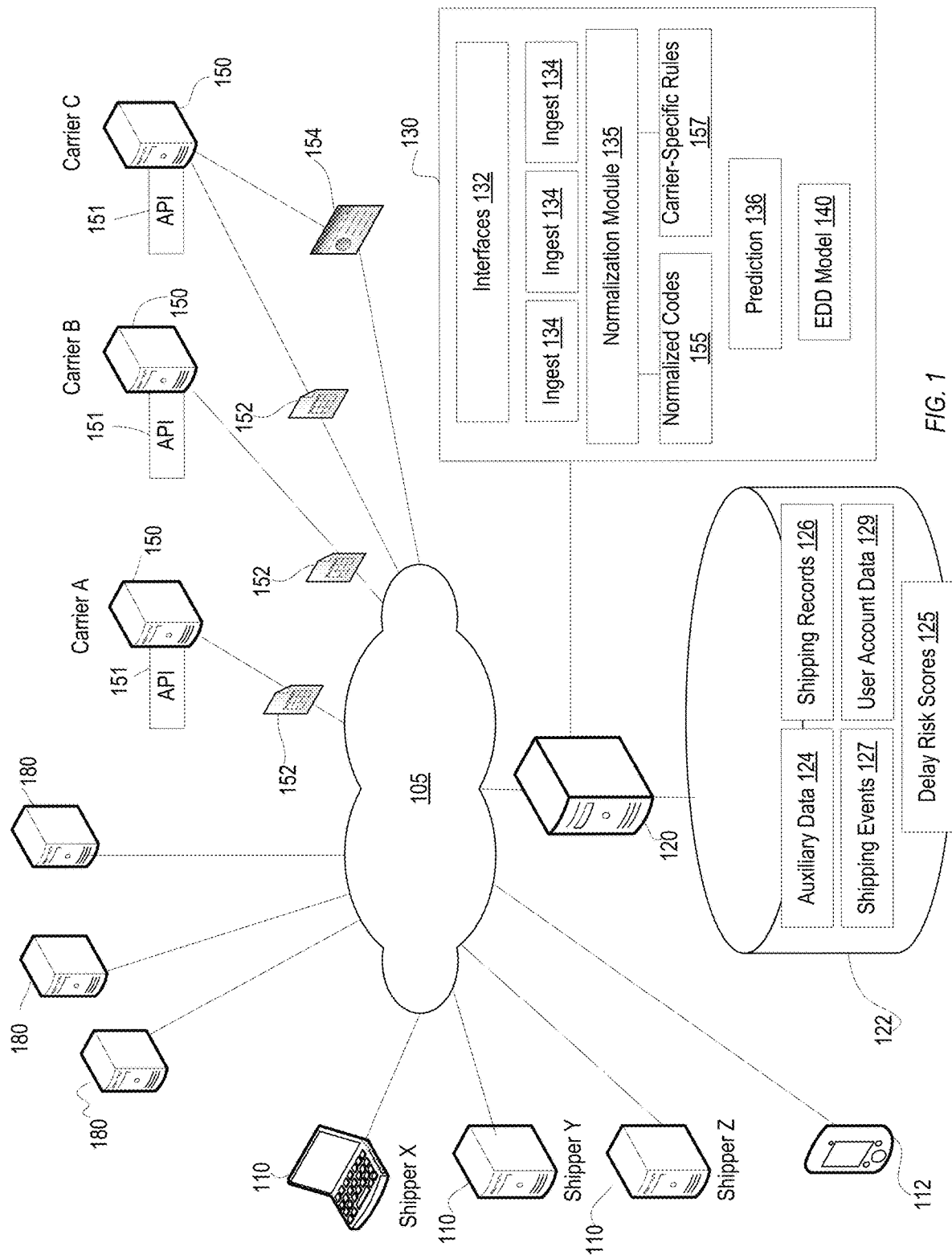
FIG. 1 is a diagrammatic representation of one embodiment of a topology that includes a shipping management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

This disclosure is directed to artificial intelligence-based systems to detect delays in a shipping network. Even more particularly, embodiments employ artificial intelligence to detect shipping delays across heterogenous carriers.

One particular embodiment is directed to a shipping management system having a computer system coupled to a network and a data storage device. The shipping management system uses one or more ingest modules to collect shipping information from multiple carriers. The shipping management system gathers carrier data by integrating with a Web service API using a service client to perform a request providing shipment information, such as a tracking number or reference number, to the service and processing the response from the service.

Over time, a rich set of data is acquired across shipments and carriers. This acquired data for historical shipments may be transformed such that the data across shipments and carriers can be used as a training set to train a machine learning (ML) model. ML models can be trained on in-flight snapshots of historical shipments and the eventual outcome of each of the historical shipments considered—that is, whether the shipment missed it's EDD. The input features extracted for a historical shipment and used to train the model can include data about the "current" status of a historical shipment from the perspective of one or more times in the life of the shipment based on information from the carrier tracking services and, in some cases, whether information was not received from the carrier tracking services when it may have been expected to be received. Examples of input features include: carrier, service level, time since the last tracking event, type of last tracking event, time of day of last tracking event, day of week of last tracking event, time remaining to the current EDD, package weight, location of the last tracking event, distance from the last known location to the destination, and other features.

The shipping management system monitors in-progress shipments being tracked by the system and periodically assigns them risk scores based on inferences of the ML model. According to one embodiment, an ML model can be executed on predictive features extracted from an in-progress shipment to detect whether the shipment will miss its assigned EDD and output an indicator of the risk that the shipment will miss its EDD. When the risk score exceeds a certain threshold, the shipment can be identified as one predicted to miss its EDD. Embodiments may thus detect shipments that will miss their EDDs before that EDD has passed, which allows shippers and recipients to proactively understand and recover potential delays.

Embodiments may include one or more dashboards (for example, a web-based dashboard generated by an interface module) accessible by a user that is associated with an account holder. From the dashboard, the user can view various metrics and access functions of a shipping system, such as scheduling shipments. In some embodiments, a user can see information for shipments associated with the account holder including indications of shipments that are predicted to miss their respective EDDs. Numerous other embodiments are also possible.

Embodiments of the systems and methods of the present invention may be better explained with reference to FIG. 1, which depicts one embodiment of a topology that may be used to implement certain embodiments. The topology comprises shipping management system 120 bi-directionally coupled to shipper computer systems 110, recipient computer systems 112 and carrier computer systems ("carrier systems") 150 through network 105. Network 105 may be for example, a wireless or wireline communication network such as the Internet or wide area network (WAN), publicly switched telephone network (PTSN) or any other type of electronic communication link.

In the embodiment illustrated, shipping management system 120 connects to shipper computer systems for Shippers X, Y and Z and carrier computer systems 150 for Carriers A, B, C. Shipping management system 120 may also connect to various other external systems 180, such as e-commerce servers, ERP systems, TMS systems, ESP/SMS systems, CSR/CRM systems. According to one embodiment, shipping management system 120 is a cloud-based system or other network accessible multi-tenant system that multiple shippers can use to manage and track shipments across homogeneous carriers. In some embodiments, the shipping management system 120 may implement various features of a shipping management system as described in United States Patent Publication 2019/0213538, entitled "System and Method for Dynamically Scheduling API-Based Shipment Updates Across Carriers," filed Jan. 1, 2019, by Bebout et al. and/or implement various methods described therein. United States Patent Publication 2019/0213538 is hereby fully incorporated herein by reference for all purposes.

Shipping management system 120 may comprise one or more computer systems with central processing units executing instructions embodied on one or more computer readable media where the instructions are configured to perform at least some of the functionality associated with embodiments of the present invention. These applications may include a shipping management application 130 comprising one or more applications (instructions embodied on a computer readable media) configured to implement interfaces 132, data ingest modules 134, a normalization module 135 and a prediction service 136. Prediction service 136 may include or utilize an ML model 140 trained to detect whether shipments will miss particular milestones. For example, ML model 140 may be an EDD model trained to detect shipments that will miss their EDDs.

Shipping management system 120 includes a data store 122 storing a variety of data collected from shipper computer systems 110, recipient computer systems 112, carrier systems 150 and external systems 180 and data generated by shipping management system 120. By way of example, but not limitation, data store 122 includes shipping records 126, event records 127, user account data 129, auxiliary data 124, delay risk scores 125 for shipments, and other data.

ML model 140 may be trained using data from shipping records 126 and event records 127. In some cases, auxiliary data 124 is used in augmenting or transforming data from shipping records and shipping event records for training or inference. In some embodiments, auxiliary information may include information collected from external systems 180.

User account data 129 includes account information for holders of accounts with shipping management system 120 (e.g., profile data for account holders). The account holder may be an individual, a shipper, or an entity, such as a retailer, that uses drop shippers, where the drop shippers may or may not be account holders. The user account data 129 may include carrier credentials where the carrier credentials include information necessary to retrieve shipment data for the account holder from one or more carrier computer systems 150. The carrier credentials for an account holder/carrier pair (e.g., a shipper/carrier pair) may include a customer number, username and password, secret key, token, or other information so that shipping management system 120 can request shipment data. For example, the account information for Shipper X may include information to log in and request shipment data for Shipper X from Carrier A's system 150, information to log in and request shipment data for Shipper X from Carrier B's system 150, and information to log in and request shipment data for Shipper X from Carrier C's system 150. The carrier credentials may also include information so that shipping management system 120 can log into a carrier computer system 150 on behalf of the account holders to schedule a pickup, schedule delivery or perform other operations. The carrier credential information may be provided as part of onboarding a shipper or other account holder.

Data store 122 further includes data for tracking shipments. In particular, data store 122 includes shipping records 126 and event records 127. In general, shipping records 126 and event records 127 can hold a wide variety of information about individual shipments and associated tracking events. Shipping management system 120 may include shipping records for a large number of shipments and any number of tracking event records for each shipment. For example, shipping management system 120 may maintain many thousands or millions of shipping records and event records. The shipping records may be stored in one or more tables in a database or according to another data storage structure. While illustrated separately, the event records for a shipment may be considered to be part of the shipment's shipping record.

FIG. 2A, FIG. 2B and FIG. 2C illustrate an example of a shipping record 200 for an in-progress shipment. While certain shipment attributes are populated in FIG. 2A-2C with particular values, these values are provided for the sake of example. Moreover, the set of attributes illustrated in FIGS. 2A-2C is provided by way of example and, as would be appreciated, a shipping management system can track a wide variety of additional or alternative information for shipments.

In the embodiment illustrated, each shipment has an internal shipment id 202 (FIG. 2B) that the shipping management system 120 uses to identify the shipment. The shipment information may also identify the shipper and carrier for a shipment. For example, shipments can be associated with specific account holders (e.g., shippers or other entities) of the shipping management system 120, as illustrated by customer account information 208, which specifies the customer account with which the shipment is associated. Role 210 specifies the role as the account holder with respect to the shipment (e.g., "shipper", "drop-shipper" or another role). Access controls can be enforced so that a particular user will only be able to access the shipping records associated with the account holder for which the user has access.

Shipping record 200 includes information regarding the origin and destination of the shipment including, for example, origin address information 212 (i.e., address at which the shipment was or is to be picked up or received by the carrier) and destination address information 214 for the shipment. Similar to the destination address information 214, origin address information 212 may include attributes for the city, state/province, postal code, and country.

Shipping record 200 also includes information about the carrier of the shipment including a carrier id 220 to identify the carrier and a tracking number 204 or other id used by the carrier for the shipment. The shipping record can also include a normalized carrier service level 224 for the shipment.

Shipping record 200 also includes physical information of the shipment, such as the quoted weight 226 (the weight quoted in the order) and the actual weight 228 of the shipment. Shipping record 200 may also include other information about the physical shipment, such as the dimensions of the shipment.

Shipping record 200 includes a set of estimated delivery date (EDD) information 240. As will be appreciated, a carrier or shipping management system 120 may determine an estimated delivery for date for a shipment when an order is received or relatively early in executing the shipment. As the shipment progresses, the carrier or shipping management system 120 may update the EDD. As such, shipping record 200 may include an original EDD 242 and a current EDD 244 for the shipment. Original EDD 242 represents the first EDD assigned to the shipment and current EDD 242 represents a most recently assigned EDD for the shipment. In some embodiments, original EDD 242 and current EDD 244 hold EDDs provided by the carrier. In other embodiments, one or more of original EDD 242 or current EDD 244 may be assigned by shipping management system 120. The shipping record also includes the order date 245 (that is the date the order for the shipment was received by shipping management system 120 or the carrier), a ship date 246 indicating the date the shipment actually shipped, and a promised delivery date 248 for the shipment. Moreover, as would be appreciated, the shipping record for a completed shipment can also include (e.g., via an event record) the date and time at which the shipment was delivered.

Shipping record 200 also includes shipment tracking information from the latest tracking event, such as a status 250 and exception information 252. In general, the status 250 can hold the most recent status of the shipment based on a set of tracking events associated with the shipment. Exception information 252 may hold information about the most recent exception based on the set of tracking events associated with the shipment. In some embodiments, the exception information 252 is cleared if the tracking events indicate that the exception has been resolved.

In the illustrated embodiment, shipping record 200 includes a set of delivery appointment scheduling information 254 for the shipment. As described in U.S. patent application Ser. No. 16/915,507, entitled "Intermediated Shipping Logistics System for Facilitating Delivery Appointment Scheduling With Outsourced Carrier Systems," by Bourland et al., filed Jun. 29, 2020, which is hereby fully incorporated by reference herein, a carrier may require that the intended recipient for a shipment schedule a delivery appointment with the carrier. However, the carrier may not make scheduling available until a certain milestone is reached, such as the shipment arriving at the last mile terminal or other milestone. According to one embodiment, delivery appointment scheduling information 256 includes a delivery_scheduling object with appointment_required and scheduling_information objects. The appointment_required object indicates whether the shipment requires a delivery appointment. The scheduling_available object indicates whether online delivery appointment scheduling is available for the shipment. The delivery_appointment object 258 includes fields representing the current scheduled date and time range for the shipment's delivery appointment if any. For example, delivery_appointment object may include attributes for appointment date, appointment_end_time, and appointment_begin_time.

A shipment may be associated with any number of tracking events, which may be stored in associated event records. For example, shipping event records can store shipment statuses (including exceptions) over the life of a shipment. In some embodiments, exceptions may include normalized exceptions determined from status information provided by a carrier or predicted exceptions generated by shipping management system 120.

An event record may include a variety of information about a tracking event. Using the example of event record 260, each tracking event has an internal event id 262 for tracking the event and an indication of the shipment with which the tracking event is associated (e.g., shipment id 264). An event record may include a creation time 266 indicating when the event record for the event was created and an event modification time 268, indicating the time when the event record was modified by shipping management system 120. The event creation and modification times may be the same if the event record was not modified after creation.

Event records may store shipment tracking information such as statuses and exceptions. For example, an event record may include status information provided by the carrier, such as a status code 270 or status description 272. The carrier provided status code may be mapped to a normalized status code 274 and the carrier provided description may be mapped to a normalized status description 276. Here, the normalized status code "T" means that the shipment is in transit. There may be normalized status codes for a variety of other statuses, such as, but not limited to: Scheduled, Out for Delivery, Delivered, Unknown, Delivered to Sender, Canceled, Returning to Sender, Quoted, Undeliverable, New, Pickup Appointment. The event record may also include an indication 284 of whether the status is considered an exception.

The event record can include a time and date at which the tracking event occurred. For example, an event record can include a status time stamp, such as status local_date_time 278 indicating the local date/time at the location of the package when the event occurred that caused the status update. Status update time information 280 breaks the status_local_date_time into components of the date of the status update ("local_date") and the time of day of the status update ("local_time"). The status_local_date_time 278 value may be provided by the carrier to indicate when shipment achieved the status as determined by the carrier (e.g., expressed based on the time zone of shipment's location when it achieved the status). The event record may also include an offset to a normalized time zone like UTC (e.g., as illustrated in status update time information 292). The status_local_date_time for tracking events can be used to determine the order in which the tracking events actually occurred, since the tracking events may not all be received in order.

A status, including an exception, provided by the carrier (or determined by shipping management system 120) may have an associated geographic location for the shipment. The geographic location may include, for example, an address, a city and state/province, a postal code or other geographic information. For example, event record 290 may include geographic location information 294 indicating that the carrier-provided status in event record 290 is associated with the city Mississauga, Ontario.

While event record 260, event record 290, and event record 295 illustrate examples of event records for carrier-provided statuses, event records may also record events based on statuses (including exceptions) determined by shipping management system 120.

Returning to FIG. 1, carrier computer systems 150 provide shipment-specific information, including shipment tracking data through a variety of mechanisms. Data sources for shipment-specific information include, but are not limited to, shipment record files (e.g., spreadsheets, comma-separated files, other structured files, etc.), public APIs provided by the carriers, data scraped from web sites, data manually received from carriers, data pushed from a carrier, etc. For a given carrier, data may be acquired in multiple ways and integrated together to provide a combined view of the data compared to getting data from a single source. In the embodiment illustrated, each carrier computer system 150 provides an API 151 with endpoints for collecting shipment-specific tracking information.

When integrating shipping management system 120 with a carrier computer system 150, a "discovery process" occurs to make a determination of what combination of data sources will give the best overall information. This discovery process could take the form of research, manually consulting with the carrier, etc. Ingest modules 134 can then be configured to gather shipment specific data from that carrier. For a given carrier, data may be acquired from multiple sources and integrated together.

Some carrier systems 150 implement a document interchange mechanism that allows users to register to receive shipment report files 152 formatted according to a defined specification. The document interchange may be performed using a standardized electronic data interchange (EDI) format or a proprietary format. In another embodiment, the document interchange may involve a carrier system 150 sending shipment report files 152 as email attachments to an email address accessible by shipping management system 120 or uploading to an FTP site or other network location accessible by shipping management system 120.

The shipment report files 152 provided by a carrier system 150 can be formatted according to a specification known to both the carrier and the implementer of shipping management system 120. For example, the shipment report files 152 may be a comma-separated value file or spreadsheet in which the columns adhere to a defined specification. An ingest module 134 may be configured to request, receive and or access shipment report files from a carrier and process the shipment report files according to the defined format to extract shipment data.

Shipment report files 152 have a variety of degrees of information, depending on the carrier. For some carriers, the shipment report files 152 merely indicate the existence of shipments (e.g., simply provide a list of shipment numbers for shipper). In other cases, the shipment report files 152 include additional shipment information including, in some cases, shipment status information.

Some carrier systems 150 provide public APIs 151 that allow external systems to access tracking data. An ingest module 134 may be programmed to make calls to the API 151 of a carrier system 150 to collect tracking data related to shipments by that carrier. As a more particular example, an ingest module 134 can be configured to integrate with a Web Service API using a service client to perform a request with shipment data, such as a tracking number or reference number, to the web service and process the response from the service.

Some carriers provide shipment-specific information using both shipment report files 152 and API-based shipment data such that the information from periodic shipment report files 152 can be augmented using tracking updates collected via the API 151. A carrier system 150, for example, may be configured to provide periodic shipment report files 152 (e.g., every few minutes, every several hours or other period) on a per-shipper basis and provide additional shipment-specific information via an API 151. For example, Carrier A's system 150 may periodically provide a shipment report file 152 for Shipper X, a shipment report file 152 for Shipper Y and a shipment report file 152 for Shipper Z and also provide shipment status updates via the respective API 151.

Shipping management system 120 may thus include an ingest module 134 configured to receive shipment report files 152 from a carrier system 150 and an ingest module 134 configured to poll the carrier system's API 151 for updates. For example, shipping management system 120 may include a first ingest module 134 configured to process shipment report files 152 from Carrier A to extract shipments associated with a shipper and a second ingest module 134 to poll the API 151 provided by Carrier A to update shipment status information.

Other carrier systems 150 may provide tracking data through a web page interface, such as web page 154. However, since the structure of a web page can be understood through observation, an ingest module 134 may be programmed to provide shipment information to a web site, download the HTML content from the carrier tracking web page and extract the relevant tracking information using rules to identify the tracking data on the page. Ingest modules 134 may also be programmed to collect tracking data through other mechanisms.

It can be noted that shipping management system 120 may receive, via interaction with carrier systems 150, shipment data on shipments regardless of whether the shipments were executed through shipping management system 120. Thus, shipping management system 120 can discover shipments not initiated through shipping management system 120 and unify shipment-specific data for shipments initiated through various channels and across carriers.

Shipping management system 120 utilizes interfaces 132 configured to, for example, receive and respond to queries from users at shipper computer systems 110 or recipient computer systems 112, interface with carrier computer systems 150, and interface with other external systems 180, obtain data from or provide data obtained, or determined, by shipping management system 120 to any of shipper computer systems 110, recipient computer systems 112, carrier computer systems 150 and other external system 180. It will be understood that the particular interface 132 utilized in a given context may depend on the functionality being implemented by shipping management system 120, the type of network 105 utilized to communicate with any particular entity, the type of data to be obtained or presented, the time interval at which data is obtained from the entities, the types of systems utilized at the various entities, etc. In some embodiments, these interfaces may include, for example web pages, web services or application programming interfaces (APIs). In particular, in some embodiments, shipping management system 120 can provide an API so that online ordering systems may be integrated with shipping management system 120.

Shipping management system 120 can become aware of shipments from several sources. According to one embodiment, shipping management system 120 provides an interface 132 through which a user at a shipper computer system 110 can define a shipment. An ingest module 134 can be configured to receive and process order-level information from shippers in the form of data files exchange or Web Service API integration and relevant shipment data. The shipment data may include an account holder if different than the shipper (e.g., a drop shipper can indicate or it may be implicit that the shipment is on behalf of a particular retailer), recipient, origin address, destination address (consignee), weight, product class and dimensions and other information. Shipping management system 120 can provide carrier selections to the user so that the user may select a final shipper or shipping management system 120 can automatically select the carrier. In any case, if a shipper user uses the shipping management system 120 to initiate a shipment, then shipping management system 120 will be aware of the shipment and can create a shipping record and related records.

Shipping management system 120 may then interact with the carrier system 150 for the selected carrier to execute the shipment. In some cases, carrier systems 150 may provide public APIs 151 that allow external systems to execute shipments and access tracking data and shipping management system 120 may use the API to execute the shipment.

In other cases, a shipper can initiate a shipment directly with a carrier without going through shipping management system 120. The shipper can provide a tracking number or other shipment identifier to shipping management system 120 and other shipment information (e.g., whether an intended recipient should receive notifications and the contact information for the intended recipient) via a user interface so that shipping management system 120. Using the information about the shipment provided by the shipper, the shipping management system can request shipment information from the carrier computer system 150.

In some embodiments, the shipping management system can discover shipments associated with an account holder from information provided by a carrier computer system 150 and obtain shipment information from the carrier computer system 150. The carrier can make the shipping management system 120 aware of an account holder's shipments via shipment report files, notifications, responses to requests, or another mechanism. When processing shipment-specific information from a carrier, shipping management system 120 can identify if the shipment is a new shipment (a shipment for which there is no shipping record) or an existing shipment. If the shipment is a new shipment, shipping management system 120 can create a shipping record and associate records for the shipment. If information received from a carrier about a shipment relates to an existing shipping record (for example, due to the use of a unique reference number and destination postal code), shipping management system 120 will integrate the information, rather than create separate records for the same shipment.

During shipment, carrier computer systems 150 provide shipment tracking data that indicates the status shipments (e.g., when a shipment was ready for pickup, when the shipment was picked up, check in/check out at various tracking locations, when the shipment was actually delivered and other information). Each tracking update can contain one or more of status (status code or other description), location and time information for a shipment. In some cases, a tracking update may indicate an exception (tracking event that delays or otherwise adversely affects a shipment).

Exception data may include, for example, data that indicates that a pickup was missed, a shipment was delivered late, a shipment was damaged, etc. Shipping management system 120 can update records for existing shipments. In some embodiments, shipping management system 120 can identify new shipments (e.g., shipments not initiated through the shipping management system) from the tracking data.

Ingest modules 134 may use a set of scheduling rules to schedule how often tracking data is requested from the different sources, unless the update frequency is controlled by the carrier as may be the case when receiving shipment reports via email attachments. The scheduling rules can take into consideration the current status of the shipment, the type of shipment, the expected delivery date, the carrier, whether a person or system is subscribed for updates (e.g., SMS text notifications of updates) or other factors.

The collected data may include, among other information, both temporal ("when") and location ("where") information that is used to build a full context of each tracking update. A tracking update may include a status (status code or description) for a shipment, a time for the status and, in some cases, a location associated with the status. The exception information will either be extracted as-is (if the carrier provides such information) or can be computed through status mapping using carrier-specific rules. In some embodiments, the system can intelligently fill in gaps in the collected information by leveraging known information about the shipment, such as origin and destination information. For example, if the location information for a "delivered" tracking update is not available, the shipment destination information can be used to fill in that information.

When processing shipment-specific information, the shipping management system can identify if the shipment is a new shipment (a shipment for which there is no shipping record 126) or an existing shipment. If the shipment is a new shipment, shipping management system 120 can create a shipping record 126. In general, shipments can be identified as new or existing shipments because carriers assign each shipment a unique shipment or tracking number. In some cases, when a shipment record is created, it only includes a limited set of shipment information. Additional information may be obtained from the respective carrier system 150. Additionally, the shipment record may be augmented with status, exception, and scheduling information.

Normalization module 135 is configured to map between the carrier specific formats used by each carrier system 150 and normalized data. In accordance with one embodiment, normalization module 135 includes normalization rules (e.g., carrier-specific status mappings 157) to map the carrier tracking codes in the received carrier data to (internal) normalized tracking codes 155. According to one embodiment, normalization module 135 processes carrier-specific status mappings 157 that map specific status code values or status description values or both to one of a number of normalized statuses along with an exception category when appropriate. In general, the statuses correspond to various stages of a shipment (e.g., pickup_scheduled, available_for_pick_up, picked_up, in-transit, out_for_delivery, delivered). As discussed, some status codes may represent exceptions. Some non-limiting examples of mapping status codes and classifying exceptions are described in United States Patent Publication 2019/0213538, entitled "System and Method for Dynamically Scheduling API-Based Shipment Updates Across Carriers," filed Jan. 1, 2019, by Bebout et al. is fully incorporated herein by reference for all purposes.

Carriers often provide EDDs for shipments and prediction service 136 can be configured to detect shipments that will miss their EDDs. According to one embodiment, prediction service 136 may include or utilize ML model 140 trained on a set of input features to detect shipments that will miss their EDDs. For example, ML model 140 may be trained to classify shipments as "on-time" or "delayed" and output a delay risk score (e.g., a probability that the shipment should be classified "delayed"). The shipment information and the delay risk score for the in-progress shipment can be stored in a database indexed for a web application. According to one embodiment, the in-progress shipment is determined to be at risk of missing its estimated delivery date if the delay risk score meets a configurable threshold (say, 0.5, 0.75 or another threshold).

As discussed above, shipping management system 120 can learn about shipments from a variety of sources and the shipments can be tracked via carrier APIs 151 or other mechanisms. Shipment data can be regularly sent to or otherwise regularly analyzed by prediction service 136. According to one embodiment, prediction service 136 executes ML model 140 to infer a delay risk score for the shipment. The delay risk score and shipment attributes can be stored in a database and indexed to a web application. Shipments that have a delay risk score greater than a threshold may be identified as being at risk.

A shipment can be revaluated using ML model 140 each time a tracking event for the shipment is received from the carrier. In addition, or in the alternative, the shipment can be reevaluated periodically in the absence of receiving a tracking update for the shipment from the carrier.

Figure 3:
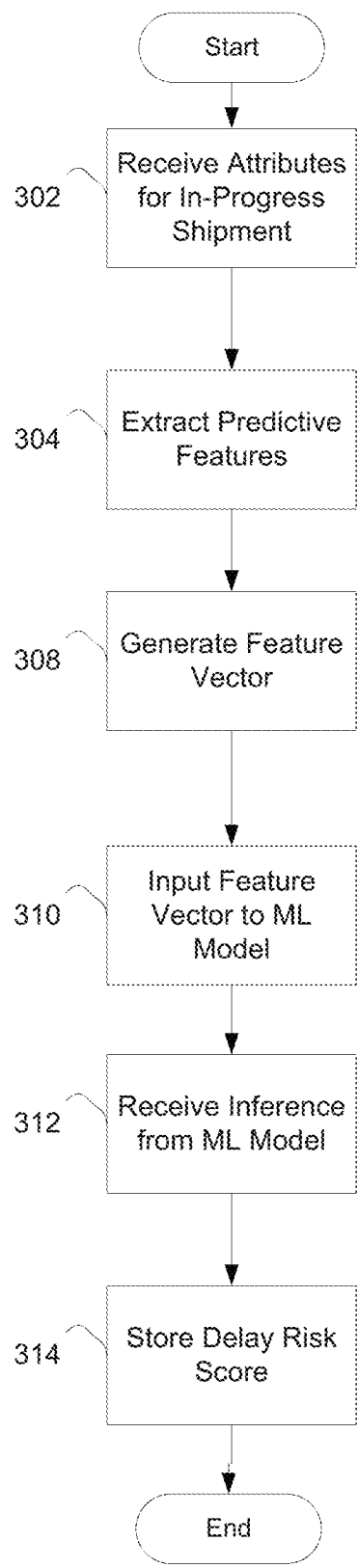
FIG. 3 is a flow chart illustrating one embodiment of processing shipping information for an in-progress shipment.

FIG. 3 is a flow chart illustrating one embodiment of processing a set of shipment attributes to determine a delay risk score. The steps of FIG. 3 may be embodied as computer-executable instructions on a non-transitory computer-readable medium. One or more steps of FIG. 3 may be implemented by a shipping management system.

The shipping management system can track shipment information for in-progress shipments. Thus, at step 302, prediction service 136 can access shipment information (e.g., a shipping record) or otherwise receive attributes of an in-progress shipment. For example, prediction service 136 may receive data for a shipment according to FIGS. 2A-2C.

At step 304, prediction service 136 extracts a set of predictive features for the shipment. The set of predictive features may comprise a variety of features including, but not limited to, features representing statuses, status relationships, status timings, the carrier, physical information for the shipment, or any other information about an in-progress shipment. According to one embodiment, the set of predictive features includes one or more timestamp dependent features. Examples of predictive features include, but are not limited to: carrier, service level, time until next tracking event, type of last tracking event, time of day of last tracking event, day of week of last tracking event, time remaining to the current EDD, package weight, location of the last tracking event, distance from the last known location to the destination.

FIG. 4 illustrates an example embodiment of a set of predictive features extracted based on the attributes of FIGS. 2A-2C, though FIG. 4 represents a different package than FIGS. 2A-2C. According to one embodiment, the predictive features set includes: carrier, service level, time until next tracking event, type of last tracking event, time of day of last tracking event, day of week of last tracking event, time remaining to the current EDD, package weight, location of the last tracking event, distance from the last known location to the destination. Using the example attribute names of FIG. 2A, prediction service 136 can extract the carrier_id value (that is, the carrier id value "130"), actual_weight (e.g., "3.1") and the carrier_service_level (e.g., "Expedited Parcels"). Thus, for example, the set of extracted features of FIG. 4 includes a carrier_id feature 402, an actual_weight feature 404 and a customer_service_level feature 406. In the example, the carrier service level extracted from the carrier_service_level field is mapped to the normalized service level "ground."

For an in-progress shipment, the "time remaining to EDD" can be based on the current timestamp $t_c$ for the time at which the prediction is made for the shipment. Using the example of FIG. 2A, prediction service may extract the original_estimated_delivery_date value or the estimated_delivery_date value, depending on configuration, and determine the "time remaining to EDD" as the extracted EDD minus $t_c$ (e.g., using a normalized time zone). Thus, extracted features 400 include a time_until_edd feature 408.

The "time until next tracking event" may be based on the current timestamp $t_c$ and the time that the last tracking event occurred. As described in United States Patent Publication 2019/0213538, entitled "System and Method for Dynamically Scheduling API-Based Shipment Updates Across Carriers," filed Jan. 1, 2019, by Bebout et al. and/or implement various methods described therein, a shipping management system may schedule when to check for tracking updates. The "time until next tracking update" can be the difference between the scheduled time to check for the next tracking update for the shipment and the current time $t_c$. Thus, as illustrated in FIG. 4, the extracted set of features 400 includes a "time_until_next" feature 410 representing the time to the next (scheduled) status update, which, as discussed above, can be determined based on the time since the last status update.

According to one embodiment, the "current location" for an in-progress shipment is the location specified for the most recent tracking event for the shipment. In the illustrated embodiment, the current location is stored in the "City2" field. According to one implementation, the current location only has an impact when it refers to a location with a carrier facility. In such an embodiment, City2 is limited to the most common locations that are all large carrier facilities, and all other locations are captured under 'Other'.

The lack of a location can also be considered a signal. For example, if the most recent tracking event for an in-progress shipment does not have a location, a current location of "no location" can be extracted. The "distance to destination" for an in-progress shipment is the distance between the "current location" and the destination. The current location can be determined based on the distance between the location indicated in the event record for the most recent event and the destination. In some embodiments, the distance may be determined using auxiliary data 124, such as a database of distances between cities or postal codes. In practice, the vast majority of in transit tracking events do not include a zip code and the distance lookup is costly on performance. In some implementations, the distance is simply captured as whether the package is in the same state/province as the destination. Thus, in FIG. 4, 'same_state' is used as a proxy for distance to destination. The "day of week of last status" for an in-progress shipment is the day of week associated with the most recent tracking event for the shipment. For example, prediction service 136 may extract the local_date from the event record for the most recent tracking event and determine the day of the week corresponding to that date. As shown in FIG. 4, the extracted features can include "weekday" feature 414 with the value "Monday."

The "time of day of last status," is the time of day associated with the most recent tracking event for the shipment. Prediction service 136 may extract the local_time from the event record and map the local_time to a time-of-day category, such as "Early," "Late," or other time of day. These categories may correspond to standard labor shifts at sort facilities, common dock closing times, or grouped by impact on transit time. As shown in FIG. 4, the extracted features 400 include a "time" feature 416 showing that the time 16:40:55 from event record 295 is mapped to the time of day "Late."

The "status" may be the normalized status code of the most recent tracking event associated with the shipment. For example, prediction service 136 may extract the "status" from the status field of the most recent event record for the shipment. As shown in FIG. 4, the extracted features 400 include a "status" feature 420 containing the value "T" extracted from the "status" field of the event record for the most recent event associated with the shipment.

The "carrier status" may be a carrier status code extracted from the most recent tracking event for a shipment. For example, prediction service 136 may extract the value "PR01_RECEIVED" from the carrier "carrier_status" of the event record for the most recent event and map the carrier status to a normalized code for the carrier status. In the example of FIG. 4, the extracted features 400 include a "carrier_status" feature 422 containing the normalized value "PU".

The feature set may include other features such as the status description. For example, prediction service 136 may extract the "status_desc" from the shipping record. This field can be more impactful for freight carriers, who do not provide as informative of 'carrier_status' codes. As another example, a time_till_dock_close_time can be extracted. For example, prediction service 136 may use the dock_close_time attribute from the shipping record and determine time_till_dock_close_time based on the current time $t_c$ and the dock_close_time.

Some embodiments may incorporate features that are specific to a level of service, such as leg 1 carrier, handoff timestamp, milestone and appointment availability schedule (e.g., every day, M/W/F, etc.), which may be specific to white glove (freight with delivery appointments required). As will be appreciated, Leg 1 carrier refers to shipments that are delivered by two carriers. Carrier 1 performs the line haul (leg 1), and Carrier 2 performs the final mile (leg 2). This is common in large format deliveries that require appointments and delivery inside a house. Handoff timestamp is the time when that handoff from carrier 1 to carrier 2 occurs. In this case, the time from the handoff timestamp to the most recent tracking event associated with the shipment can be determined as a feature.

Milestone is a field that provides a more granular description of the current status. While 'Arrived at Terminal, Departed Terminal, and At Destination Facility may all be 'In Transit' statuses, 'At Destination Facility' could, according to some embodiments, trigger a milestone that the shipment has arrived at the final mile hub.

In some embodiments service 136 can determine if the shipping record indicates that a delivery appointment is scheduled (e.g., if delivery_appointment contains a schedule). If the schedule dictates that appointments cannot be made until a later date, prediction services 136 reset the delivery expectation for the shipment (the EDD or promise date).

The foregoing examples of extracted features are provided by way of example only and any set of features predictive of missed EDD may be used.

At step 308, the prediction service 136 generates a feature vector representing the extracted features of the in-progress shipment. At step 310, prediction service 136 executes ML model 140 on the feature vector representing the in-progress shipment to generate an inference. ML model 140 can be trained to output a classification of, for example, "on-time" (indicating that shipment is predicted to meet its EDD) or "delayed" (indicating that the shipment is predicted to miss its EDD). The inference may comprise a delay risk score indicating a probability that the in-progress shipment is "delayed." At step 312, prediction service 136 receives the inference from ML model 140. At step 314, prediction service 136 stores the shipment attributes and the delay risk score of the shipment. According to one embodiment, the delay risk score and shipment attributes can be stored in a database and indexed to a web application. Shipments that have a delay risk score that meets a threshold may be identified as being at risk.

In another embodiment, ML model 140 may be trained to infer whether a shipment will miss its promise date. According to one embodiment, prediction service 136 may include or utilize ML model 140 trained on a set of input features to detect shipments that will miss their promise dates. For example, ML model 140 may be trained to classify shipments as "on-time" or "delayed" with respect to promise date and output a delay risk score (e.g., a probability that the shipment should be classified "delayed"). The shipment information and the delay risk score for the in-progress shipment can be stored in a database indexed for a web application. According to one embodiment, the in-progress shipment is determined to be at risk of missing its promise date if the delay risk score meets a configurable threshold (say, 0.5, 0.75 or another threshold).

At step 304, features, such as the time_until_promise_date 430 (that is, the time from the current time to the promised delivery date) and edd_to_promise_date 432 (that is, the time from the EDD to the promised delivery date), in addition to other features discussed above, can be extracted. For example, prediction service 136 may use the promised_delivery_date from the shipping record and determine time_until_promise_date based on the current time tc and the promised_delivery_date. As another example, prediction service 136 may use time_until_promise_date and estimated_delivery_date (or original_estimated_delivery_date, depending on configuration) for the shipment to determine edd_to_promise_date. In some embodiments, time_until_promise_date and edd_to_promise_date are used to build a model to predict missed promise dates.

At step 308, the prediction service 136 generates a feature vector representing the extracted features of the in-progress shipment. At step 310, prediction service 136 executes ML model 140 on the feature vector representing the in-progress shipment to generate an inference. ML model 140 can be trained to output a classification of, for example, "on-time" (indicating that shipment is predicted to meet its promise date) or "delayed" (indicating that the shipment is predicted to miss its promise date). The inference may comprise a delay risk score indicating a probability that the in-progress shipment is "delayed." At step 312, prediction service 136 receives the inference from ML model 140. At step 314, prediction service 136 stores the shipment attributes and the delay risk score of the shipment. According to one embodiment, the delay risk score and shipment attributes can be stored in a database and indexed to a web application.

Shipments that have a delay risk score that meets a threshold may be identified as being at risk of missing their promise dates.

FIG. 3 is provided by way of example and not limitation. Various steps may be repeated, steps may be performed in different orders, steps omitted, and additional or alternative steps performed.

Figure 5:
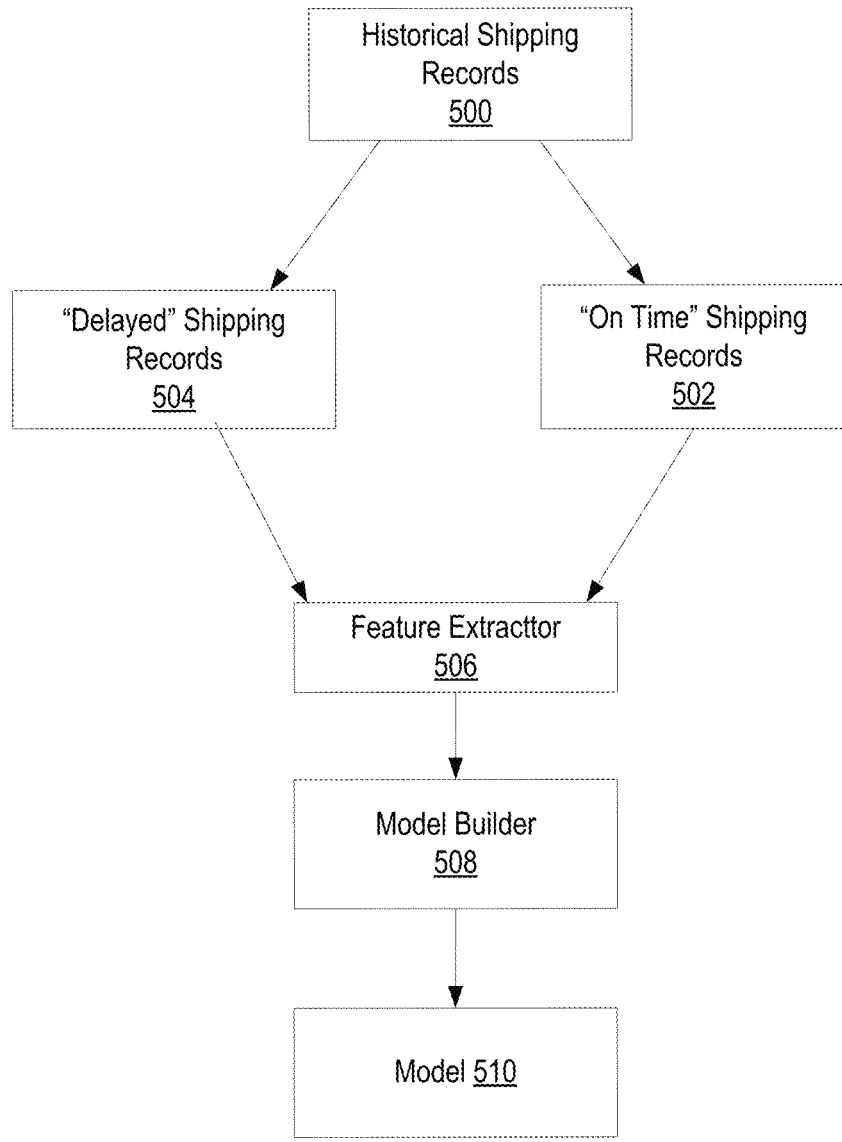
FIG. 5 is a diagrammatic representation of one embodiment of training a machine learning model.

Turning to FIG. 5, one embodiment of training an ML model 510 is depicted. ML model 510 may be any suitable model including, but not limited to, an ensemble boosted decision tree model or other decision tree-based model, a neural network, a generalized linear model, or other model. ML model 510 may be deployed, for example, as ML model 140.

Prediction service 136 collects records 500 representing historical shipments that have associated estimated delivery dates and actual delivery dates (or other termination dates). Records 500 may comprise, for example, shipping records 126 and event records 127 for completed shipments and may include, among other data, EDDs and delivery dates for the historical shipments. Prediction service 136 can thus classify historical shipment records as exemplars of the classes for which ML model 510 is being trained. For example, prediction service 136 can identify "on-time" shipment records 502 representing those shipments that were delivered by their respective EDDs and "delayed" shipment records 504 representing those historical shipments that did not meet their respective EDDs. In some embodiments, exemplar "on-time" and "delayed" shipments are identified based on original EDDs. In some embodiments, exemplar "on-time" and "delayed" historical shipments are also or alternatively identified based on modified EDDs.

As another example, prediction service 136 can identify "on-time" shipment records 502 representing those shipments that were delivered by their respective promise dates and "delayed" shipment records 504 representing those historical shipments that did not meet their respective promise dates.

A feature extractor 506 applies one or more transformations to the records 502 and records 504 to create a training set. In particular, feature extractor 506 creates a training set of in-flight snapshots of the historical shipments, where each in-flight snapshot represents a respective historical shipment from the perspective of a point in time in the life of that shipment prior to the shipment being delivered and, even more particularly, prior to an EDD assigned to that shipment.

Feature extractor 506 evaluates the in-flight snapshots of the historical shipments to extract a set of input features for each snapshot (e.g., to create a feature vector for each snapshot). The features extracted from the snapshots and the eventual outcomes are input to a model builder 508 to train the ML model 510 to predict whether a shipment will be "on-time" (e.g., meet its EDD, meet is promise date) or be delayed (e.g., miss its EDD, miss its promise date).

The set of input features may comprise a variety of features including, but not limited to, features representing statuses, status relationships, status timings, the carrier, physical information for the shipment, or any other information about an in-progress shipment. According to one embodiment, the set of predictive features includes one or more timestamp dependent features. Examples of predictive features include, but are not limited to: carrier, service level, time until next tracking event (which as discussed above, can be calculated in some embodiments, as the time since the last event), type of last tracking event, time of day of last tracking event, day of week of last tracking event, time remaining to the current EDD, package weight, location of the last tracking event, distance from the last known location to the destination. Other example features include, but are not limited to, time_until_promise_date, and time from EDD to promise date. In general, the set of predictive features extracted from an in-progress shipment correspond to input features used to train the model.

The input features extracted from an in-flight snapshot and used to train the model can include data about the "current" status of a historical shipment from the perspective of one or more times in the life of the shipment based on information from the carrier tracking services and, in some cases, whether information was not received from the carrier tracking services when it may have been expected to be received. ML Model 510 may thus represent a set of shipment statuses (e.g., current statuses) of the plurality of historical shipments. ML model 510 may also represent a set of timings relative estimated delivery dates, a set of shipment outcomes of the plurality of historical shipments and other features.

As will be appreciated, shipping management system 120 may collect data for a large number of shipments (e.g., millions of shipments across shippers and service levels). Thus, data for a large number of historical shipments and events may be considered (e.g., >500,000 parcel shipment tracking events across carriers and service levels). In some embodiments, historical shipments records may be recency weighted. Moreover, certain types of historical shipment records may be oversampled. By way of example, but not limitation, "delayed" shipments may be oversampled (e.g., from 10% to 48% of samples).

Figure 6:
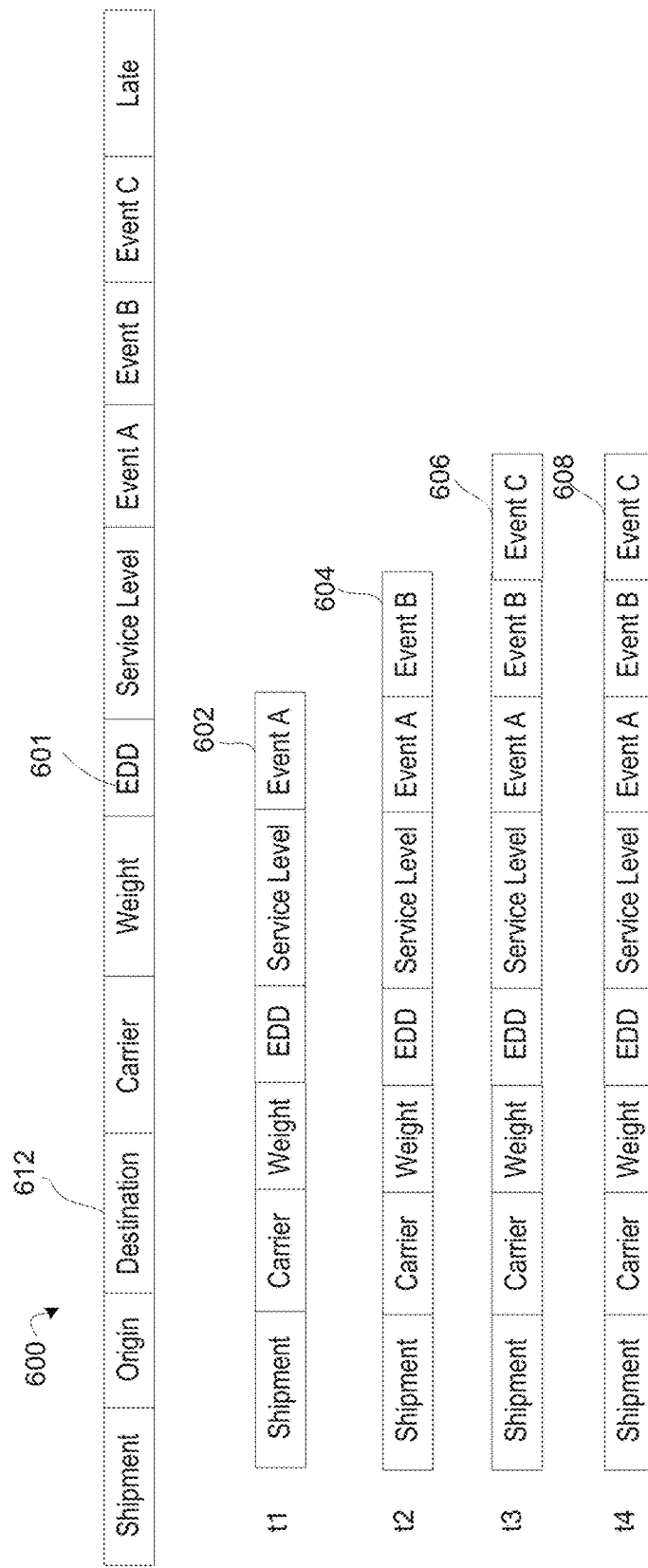
FIG. 6 is a diagrammatic representation of one embodiment of a record of a historical shipment and a set of in-flight snapshots of the historical shipment.

Turning briefly to FIG. 6, one embodiment of processing a historical shipment record 600 is illustrated. In this example, shipment record 600 represents a "delayed" shipment (a shipment that was delivered after its EDD 601). It can be noted that the historical shipment record 600 may include any information about the historical shipment including, for example, any information from a shipping record 126 and event records 127 associated with the shipment. For example, shipping record 600 may include a variety of information such as discussed in conjunction with FIGS. 2A-2C.

According to one embodiment, one or more in-flight snapshots of the historical shipment can be created (determined), where each in-flight snapshot represents the shipment at a particular time the life of the shipment prior to the shipment being delivered.

For a given snapshot time, $t_s$, feature extractor 506 considers record 600 for the historical shipment as that record would have appeared at $t_s$. According to one embodiment, feature extractor 506 creates a snapshot for each tracking event associated with the historical shipment t. For example, feature extractor 506 creates snapshot 602 for time $t_1$, snapshot 604 for time $t_2$, snapshot 606 for time $t_3$, where each snapshot corresponds to a different snapshot time that falls within the life of the shipment represented by record 600. Event A represents the "current" status of the historical shipment at time $t_1$, event B represents the current status of the historical shipment at time $t_2$, and event C represents the current status of the historical shipment at time $t_3$. In a particular embodiment, feature extractor 506 creates a snapshot for every tracking event associated with a shipment. In other embodiments, feature extract 506 creates snapshots for a subset of tracking events.

In some embodiments, the snapshot time $t_s$ for a snapshot is based on the status time of the event for which the snapshot is created. According to one embodiment, feature extractor 506 effectively drops the first event for a shipping record by not creating a snapshot when it is created. This means the first snapshot in the training sets will be some amount of time after the first event. For example, t1 may be a short amount of time after normalized status_local_date_time of event A, the normalized status_local_date_time of event B may be selected as $t_2$, and the normalized status_local_date_time of event C may be selected as $t_3$. $t4$ may be a randomly selected time.

Time stamp dependent features of in-progress shipments may be evaluated based on the lack of a real event (e.g., for example, an in-progress shipment may be evaluated based on a next status update time). To create snapshots that simulate a lack of a real event, snapshots can be taken for random snapshot times in the life of the historical shipment prior to EDD 601. For example, snapshots may be created for random times between the normalized status_local_date_time of event A and the normalized status_local_date_time of event B, random times between the normalized status_local_date_time of event B and the normalized status_local_date_time of event C, or random times after the normalized status_local_date_time of event C. In particular, snapshots may be created for one or more random times between the most recent tracking event prior to the EDD of the historical shipment. For example, snapshot 608 may correspond to a snapshot for $t_4$, which can be a random time between $t_3$ and EDD 601.

Feature extractor 506 extracts a set of input features for each snapshot. Example features include, but are not limited to, carrier, weight, service level, time remaining to EDD, time since last status update, current location, distance to destination, day of week of last status, time of day of last status, most recent tracking event status description, status, carrier_status or other features.

Using the shipping record structure of FIG. 2A, the "carrier" feature is extracted from the "carrier_id" field, weight is extracted from the "actual_weight" field, and the "service level" feature is extracted from the "carrier_service_level" field. In some embodiments, one or more of the extracted features may be normalized. For example, a carrier service level extracted from the "carrier_service_level" field may be mapped to a normalized service level. Thus, features similar to carrier_id feature 402, actual_weight feature 404 and customer_service_level feature 406 of FIG. 4 can be extracted for each of snapshot 602, 604, 606, 608.

Features such as carrier, weight and service level for a shipment typically do not depend on the snapshot timestamp, but other features are timestamp dependent, such as time remaining to EDD, time since last status update, current location, distance to destination, day of week of last status, time of day of last status, most recent tracking event status description, status, carrier_status or other features are timestamp dependent.

The EDD 601 (original EDD or current EDD) may be extracted for a snapshot and, the "time remaining to EDD" determined based on the snapshot time, which may be the status time of the most recent event in the snapshot (e.g., a normalized status_local_date_time) or other selected time, and the extracted EDD (using a normalized time zone). According to one embodiment, the "time remaining to EDD" for snapshot 602 is based on difference between the EDD 601 and $t_1$, the "time remaining to EDD" for snapshot 604 is based on the difference between EDD 601 and $t_2$, the "time remaining to EDD" for snapshot 606 is based on the difference between EDD 601 and $t_3$ and the "time remaining to EDD" for snapshot 606 is based on the difference between EDD 601 and $t_4$. It can be noted that, in some embodiments, the original EDDs of historical transactions are used when extracting "time remaining to EDD" for the in-flight snapshots of historical transactions used for training and the current EDDs are used when extracting "time remaining to EDD" for in-progress transactions used for inference.

The "time since last status update" for a snapshot may be based on the snapshot time $t_s$ for the snapshot and a status time extracted from a prior event in the snapshot. Using the example event record structure of FIG. 2C, feature extractor 506 may extract a status_local_date_time from the last event record in the snapshot, normalize the extracted status time to a normalized time zone, and determine the difference between the normalized status times for the last event in the snapshot and the time of the snapshot $t_s$. According to one embodiment, the "time since last status update" for snapshot 602 (e.g., time_until_next of FIG. 4) is the difference between t1 and the normalized status_local_date_time of event A, the "time since last status update" (e.g., time_until_next) for snapshot 604 is the difference between $t_2$ and $t_1$ (e.g., the difference between the times of event B and event A), the "time since last status update" (e.g., time_until_next) for snapshot 606 is the difference between $t_3$ and $t_2$ (e.g., the difference between the times of event C and event B), and the "time since last status update" (e.g., time_until_next) for snapshot 608 is the difference between $t_4$ and $t_3$ where $t_4$ is a randomly generated time.

The "current location" for a snapshot may be based on the location specified for the most recent tracking event in the snapshot. Using the example event record structure of FIG. 2C, feature extractor 506 may extract, for example, a city and state or province code (or other location information) from the event record of the most recent event in the snapshot. According to one embodiment, the "current location" extracted for snapshot 602 is the based on the location specified in event A, the "current location" extracted for snapshot 604 is the location specified in event B, and the "current location" extracted for snapshot 606 and snapshot 608 is based on a location specified in event C. The lack of a location in a tracking event can also be considered a signal. For example, if the most recent tracking event in an in-flight snapshot does not have a location, a current location of "no location" can be extracted for the most recent tracking event in the snapshot.

The "distance to destination" for a snapshot may be the distance between a location specified in the most recent tracking event for the snapshot and the destination. Using the example event record structure of FIG. 2C, feature extractor 506 may extract, for example, a city and state or province code (or other location information) from the event record of the most recent event in the snapshot and determine the distance between that location and destination 612. For example, according to one embodiment, the "distance to destination" for snapshot 602 is the distance between the location specified in event A and destination 612, the "distance to destination" extracted for snapshot 604 is based on the distance between the location specified in event B and destination 612, and the "distance to destination" extracted for snapshot 606 and snapshot 608 is based on the distance between the location specified in event C and the destination 612. If the most recent tracking event does not have a location (e.g., if the "current location" for a snapshot is "no location"), the "distance to destination" can be nulled out. If a linear distance cannot be determined between the location specified in the most recent event and the destination address, whether or not the shipment is in the same state as the destination can be used as a proxy for distance to destination. In some embodiments, the distance may be determined using auxiliary data 124, such as a database of distances between cities or postal codes.

The "day of week of last status" for a snapshot is the day of week associated with the last status update in a snapshot. Using the example event record structure of FIG. 2C, feature extractor 506 may extract the local_date for the most recent tracking event in a snapshot and determine the day of the week corresponding to that date. In the illustrate example, the "day of week of last status" extracted for snapshot 602 is the day of the week corresponding to a local_date for event A, the "day of week of last status" extracted for snapshot 604 is the day of the week corresponding to a local_date for event B, and the "day of week of last status" extracted for snapshot 606 and snapshot 608 is the day of the week corresponding to the a local_date for event C.

The "time of day of last status," may be the time of day associated with the most recent tracking event in the snapshot. Using the example event record structure of FIG. 2C, feature extractor 506 may extract a local_time for the most recent event in a snapshot and map that time to a time of day category (e.g., "early," "late" or other time of day). According to one embodiment, for example, the "time of day of last status" extracted for snapshot 602 is a local_time from event A mapped to a time of day category, the "time of day of last status" extracted for snapshot 604 is a local_time from event B mapped to a time of day category, and the "time of day of last status" extracted for snapshot 606 and snapshot 608 is a local_time from event C mapped to a time of day category.

The "most recent event status description" is the status description from the most recent event in the snapshot. Using the example event record structure of FIG. 2C, feature extractor 506 may extract the "most recent event status description" from the status_desc of the most recent event in the snapshot. In the illustrated example, the "most recent event status description" extracted for snapshot 602 is a status_desc extracted from event A, the "most recent event status description" extracted for snapshot 604 is a status_desc extracted from event B, and the "most recent event status description" extracted for snapshot 606 and snapshot 608 is a status_desc extracted from event C.

The "status" may be the normalized status code of the most recent tracking event in the snapshot. Using the example event record structure of FIG. 2C, feature extractor 506 may extract the "status" from the status field of the most recent tracking event in the snapshot. According to one embodiment, for example, the "status" extracted for snapshot 602 is a status code from event A, the "status" extracted for snapshot 604 is a status code from event B, and the "status" extracted for snapshot 606 and snapshot 608 is a status code extracted from event C.

The "carrier status" may be a carrier status extracted from the most recent tracking event in the snapshot. Using the example event record structure of FIG. 2C, feature extractor 506 may extract the "carrier status" from the carrier_status of the most recent tracking event in the snapshot. According to one embodiment, for example, the "carrier status" extracted for snapshot 602 is a carrier_status extracted from event A, the "carrier status" extracted for snapshot 604 is the carrier_status extracted from event B, and the "carrier status" extracted for snapshot 606 and snapshot 608 is a carrier_status extracted from event C. In some embodiments, the carrier_status values may be normalized.

Other features can also be extracted, such as, but not limited to the time_until_promise_date (that is the time from the $t_s$ to the promise date for the shipment) and the time from the EDD 601 to the promise date.

Moreover, some embodiments may incorporate features that are specific to a type of service, such leg 1 carrier, handoff timestamp, milestone and appointment availability schedule (e.g., every day, M/W/F, etc.), which may be specific to white glove (freight).

Thus, for each snapshot of a historical shipment, feature extractor 506 may extract various input features from the perspective of that snapshot. The input features may represent a set of shipment statuses (e.g., current statuses) of the plurality of historical shipments, a set of timings relative estimated delivery dates, and other features.

Feature extractor 506 may map the extracted features and outcome of the shipment each snapshot 602, 604, 606, 608 to a corresponding feature vector representing the input features extracted for the snapshot and a delivery outcome (that is, that the shipment was delayed). By way of example, but not limitation, the feature vector for each snapshot can represent features such as, but not limited to, carrier, weight, service level, time remaining to EDD, time since last status update, current location, distance to destination, day of week of last status, time of day of last status, most recent event status description, status, carrier status.

As another example, the feature vector for each snapshot can represent features such as, but not limited to, carrier, weight, service level, time remaining to EDD, time since last status update, current location, distance to destination, day of week of last status, time of day of last status, most recent event status description, status, carrier status, time to promise date, and time from promise EDD to promise date.

This process can be carried out over any number of historical records for both "on-time" historical shipments and "delayed" historical shipments to train ML model 510 to detect late in-progress shipments.

In some embodiments, ML model 510 is trained across carriers. In other embodiments, ML model 510 is trained for a specific carrier. According to one embodiment, an ML model to detect shipments at risk of missing their EDDs is trained across carriers and an ML model to detect shipments at risk of missing their promise dates is trained for a particular carrier. For example, in some embodiments, a model may be trained specifically for freight shipments and another model trained for other shipments.

Figure 7:
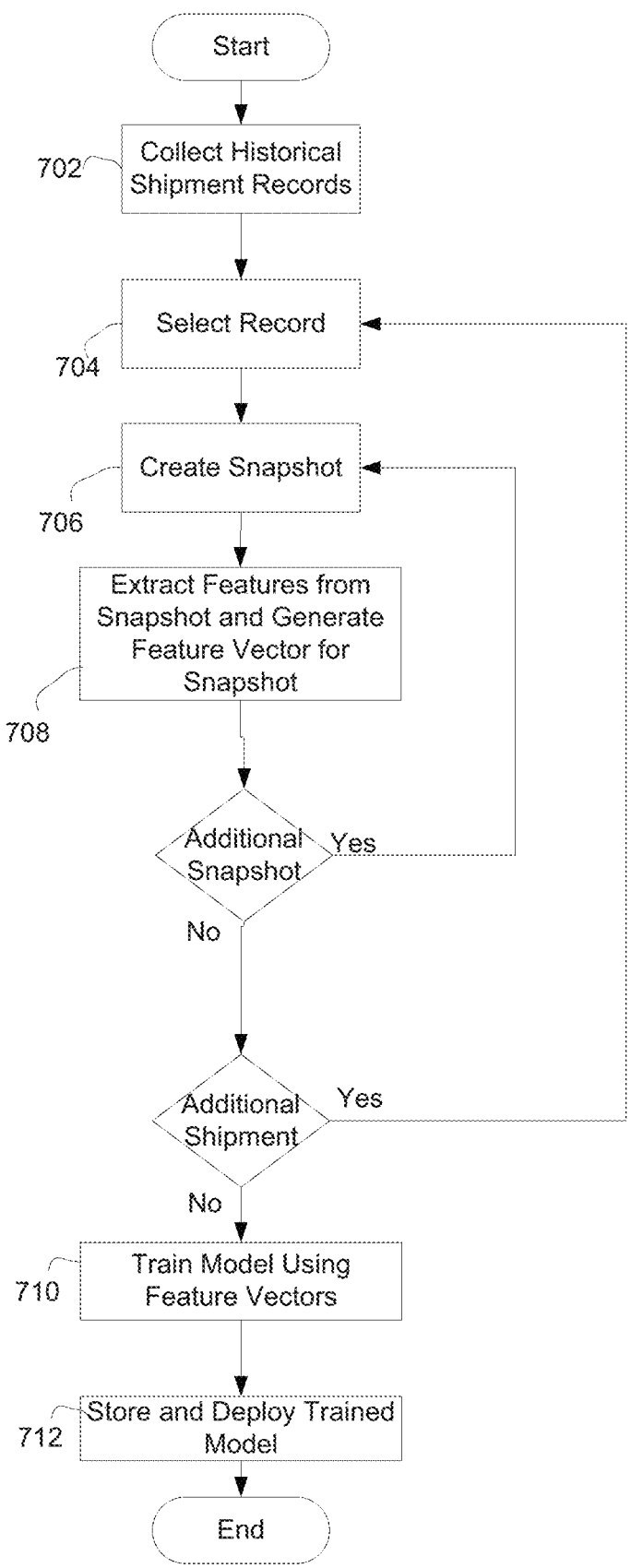
FIG. 7 is a flow chart illustrating one embodiment of a method for training a machine learning model.

FIG. 7 is a flow chart illustrating one embodiment of a method for training an ML model. The steps of FIG. 7 may be embodied as computer-executable instructions on a non-transitory computer-readable medium. One or more steps of FIG. 7 may be implemented by a shipping management system.

At step 702, a set of records representing a plurality of historical shipments is collected. According to one embodiment, prediction service 136 connects to a data source and identifies historical shipments that have both been assigned an EDD and have been completed (e.g., delivered). As such, prediction service 136 can identify a set of "on-time" exemplar records and a set of "delayed" exemplar records with respect to EDD. In addition, or in the alternative, the historical shipments have promise dates and prediction service can identify a set of "on-time" exemplar records and a set of "delayed" exemplar records with respect to promise date. In one embodiment, the historical shipments from across carriers are used. In another embodiment, a model is trained for a specific carrier using historical shipments from that carrier.

The prediction service selects a record for a historical shipment (step 704) and, at step 706, creates an in-flight snapshot for the historical shipment. The in-flight snapshot represents the historical shipment at a point in time in the life of the historical shipment. At step 708, prediction service 136 extracts a set of input features from the snapshot and generates a feature vector representing the input features of the snapshot and the outcome of the historical shipment (e.g., "on-time" or "delayed"). The prediction service 136 may repeat steps 706 and 708 for any number of snapshots and any number of historical shipments.

At step 710, the prediction service inputs the feature vectors representing the exemplar snapshots and corresponding actual classifications (outcomes) into a model builder configured to generate a prediction model from the feature vectors and actual classifications. In one embodiment, the predictive features and outcomes are used to train an XGBoost (XGBClassifier) or other gradient decision tree model. Other types of models may also be trained, including, but not limited to, neural networks. The prediction service, at step 712, can store and deploy the resulting prediction model (e.g., as ML model 140).

FIG. 7 is provided by way of example and not limitation. Various steps may be repeated, steps may be performed in different orders, steps omitted, and additional or alternative steps performed.

Figure 8:
FIG. 8 illustrates one embodiment of a user interface.
Figure 9:
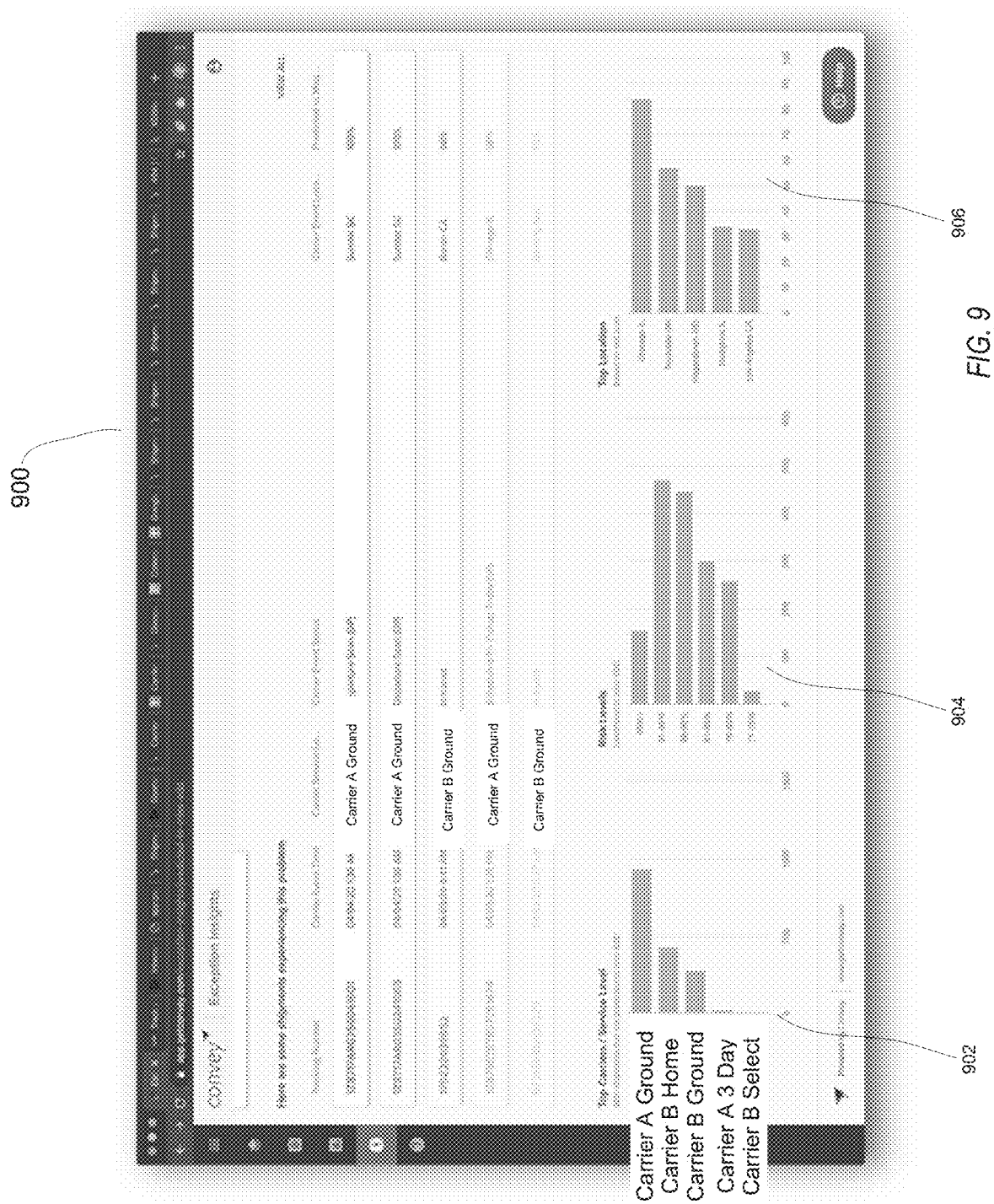
FIG. 9 illustrates another embodiment of a user interface.

As discussed above, in-progress shipments may be evaluated using a trained ML model to determine delay risk scores. Shipments having delay risk scores that exceed a configurable threshold may be marked as at risk of missing a date (e.g., EDD or promise date). Shipping management system 120 can provide a UI that allows a user associated with an account to view shipments associated with the account. For example, shipping management system 120 can provide a user interface to allow a user to view the details of individual shipments that are marked as "at risk." Further shipping management system may provide various views. FIG. 8, for example, illustrates one embodiment of a user interface 800 that allows the user to view for example statistics on shipments that are considered at risk of missing the EDD. FIG. 9 provides an example of a user interface 900 that aggregates information across carriers to allow the user to view which carriers/service levels have the most shipments for the user that are predicted to miss the EDD.

User interface 900 allows shippers to triage affected shipments and take action on them (such as alerting the customer or contacting the carrier for an update), and to perform root cause analysis into any large scale delays. Chart 902 shows the distribution of in flight shipments currently identified as a delay risk across carrier service level. A shipper may wish to alert only customers who have selected a premium shipping level that their delivery has been impacted, or may wish to contact the carrier representative of a certain carrier with a large number of delayed shipments. Chart 904 also allows shippers to triage the predicted delays. A shipper may want to send alerts to customers only when they have a higher confidence the shipment will be delayed (risk score>95%). Chart 906 shows the distribution of in flight predicted delays by last known location. The top affected locations are typically carrier hubs and are often known to the shipper, so they can identify where any large scale network delays or backups are occurring.

Figure 10:
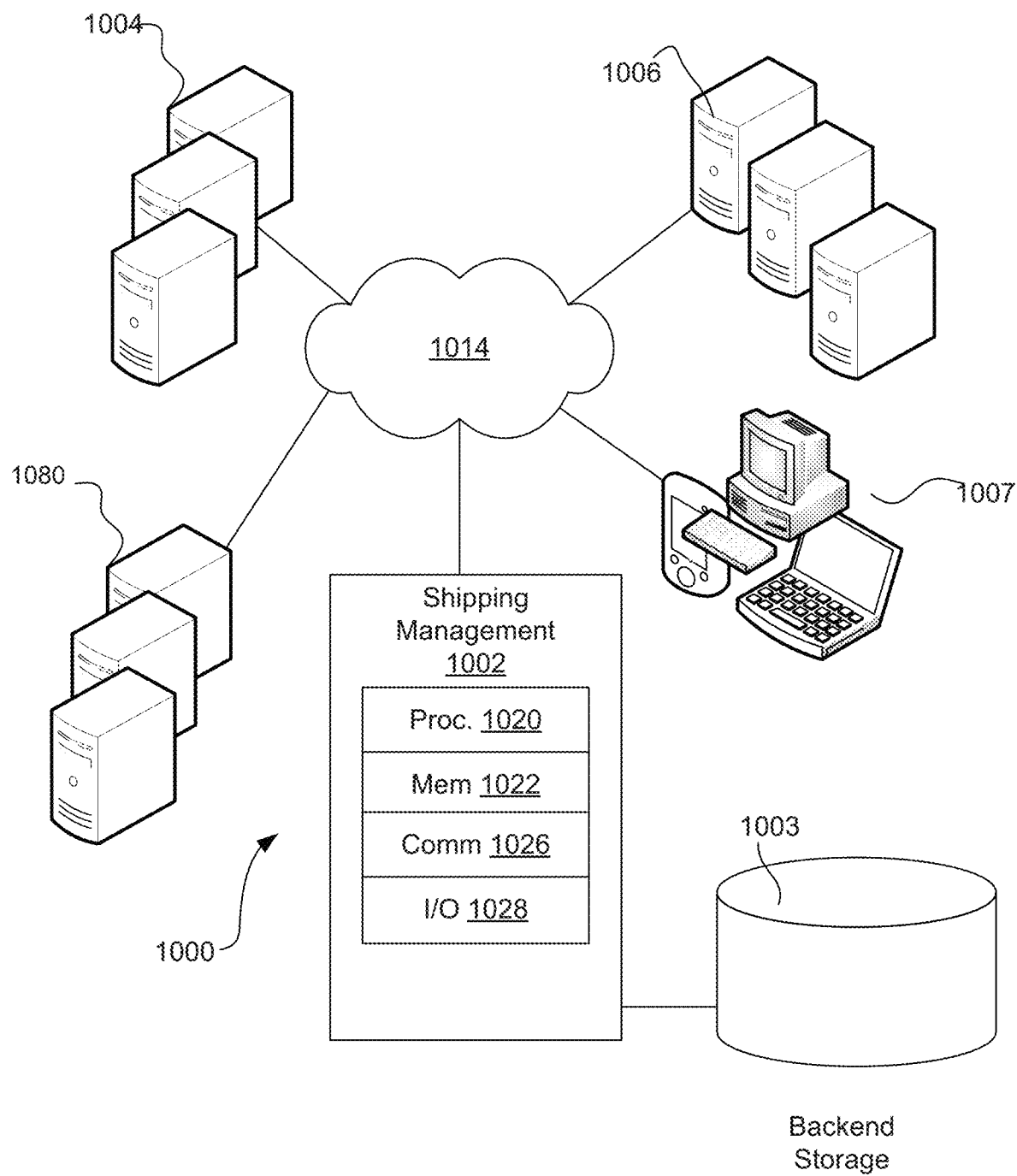
FIG. 10 is a diagrammatic representation of one embodiment of a distributed network environment.

FIG. 10 is a diagrammatic representation of a distributed network computing environment 1000 where embodiments disclosed can be implemented. In the example illustrated, network computing environment 1000 includes network 1014 that can be bi-directionally coupled to shipping management computer system 1002, shipper computer systems 1004, carrier computer systems 1006, recipient computer systems 1007, and various other external systems 1080, such as e-commerce servers, ERP systems, TMS systems, ESP/SMS systems, CSR/CRM systems. Network 1014 may represent a combination of wired and wireless networks that network computing environment 1000 may utilize for various types of network communications known to those skilled in the art. Shipping management computer system 1002 can be bi-directionally coupled to a data store 1003 storing searchable shipping records and event records, user account data, auxiliary data, delay risk scores for shipments, and other data.

For the purpose of illustration, a single system is shown for shipping management computer system 1002. However, shipping management computer system 1002 may comprise a plurality of computers (not shown) interconnected to each other over network 1014.

Shipping management computer system 1002 may include, for example, a computer processor 1020 and associated memory 1022. Computer processor 1020 may be an integrated circuit for processing instructions. For example, processor 1020 may comprise one or more cores or microcores of a processor. Memory 1022 may include volatile memory, non-volatile memory, semi-volatile memory, or a combination thereof. Memory 1022, for example, may include RAM, ROM, flash memory, a hard disk drive, a solid-state drive, an optical storage medium (e.g., CD-ROM), or other computer readable memory or combination thereof. Memory 1022 may implement a storage hierarchy that includes cache memory, primary memory, or secondary memory. In some embodiments, memory 1022 may include storage space on a data storage array. Shipping management computer system 1002 may also include I/O devices 1026 and a communication interface 1028, such as a network interface card, to interface with network 1014. Memory 1022 may store instructions executable by processor 1020. For example, memory 1022 may include code for a shipping management application, a data ingestion engine, or other code executable to provide a shipping management system, such as shipping management system 120, or component thereof. For the sake of brevity, shipping management computer system 1002 is illustrated as having one of each of the hardware components, even if more than one may be used.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods, or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer program product comprising a non-transitory, computer-readable medium storing thereon a set of computer-executable instructions, the set of computer-executable instructions comprising instructions for:
    collecting a set of records representing a plurality of historical shipments, each historical shipment in the plurality of historical shipments having a historical shipment estimated delivery date and a historical shipment actual delivery date;
    for each historical shipment in the plurality of historical shipments, accessing a training set of in-flight snapshots from multiple different snapshot times for that historical shipment, wherein each in-flight snapshot in the training set of in-flight snapshots represents a respective snapshot time while that historical shipment was in-flight and before that historical shipments was delivered, and wherein each in-flight snapshot in the training set of in-flight snapshots has an associated time remaining to estimated delivery date based on the respective snapshot time and the historical shipment estimated delivery date of that historical shipment;
    for each training set of in-flight snapshots respectively corresponding to the plurality of historical shipments:
        extracting a set of input features respectively corresponding to that training set of in-flight snapshots, and
        generating a feature vector based on the set of input features;
    training a machine learning model using the feature vectors that were respectively generated for the training sets of in-flight snapshots;
    tracking shipment information for an in-progress shipment, the shipment information comprising status information and an associated estimated delivery date for the in-progress shipment, wherein the shipment information is tracked during shipment of the in-progress shipment; and
    executing the machine learning model on the shipment information for the in-progress shipment to output an inference for the in-progress shipment, the inference indicating a probability of whether delivery of the in-progress shipment will be delayed.

2. The computer program product of claim 1, wherein the set of computer-executable instructions further comprises instructions for:
    based on a determination that the probability of whether delivery of the in-progress shipment will be delayed exceeds a threshold, marking the in-progress shipment as being at risk of missing the associated estimated delivery date for the in-progress shipment.

3. The computer program product of claim 2, further comprising storing the shipment information and the probability of whether delivery of the in-progress shipment will be delayed for the in-progress shipment in a database indexed for a web application.

4. The computer program product of claim 1, wherein the feature vector for each training set of in-flight snapshots comprises a current status feature and a time to estimated delivery date feature.

5. The computer program product of claim 4, wherein the feature vector for each training set of in-flight snapshots includes a carrier feature.

6. The computer program product of claim 5, wherein the feature vector for each training set of in-flight snapshots includes a class of service feature.

7. The computer program product of claim 6, wherein the feature vector for each training set of in-flight snapshots includes a package weight feature.

8. A computer-implemented method, implemented by one or more processors, comprising:
    collecting a set of records representing a plurality of historical shipments, each historical shipment in the plurality of historical shipments having a historical shipment estimated delivery date and a historical shipment actual delivery date;
    for each historical shipment in the plurality of historical shipments, accessing a training set of in-flight snapshots from multiple different snapshot times for that historical shipment, wherein each in-flight snapshot in the training set of in-flight snapshots represents a respective snapshot time while that historical shipment was in-flight and before that historical shipments was delivered, and wherein each in-flight snapshot in the training set of in-flight snapshots has an associated time remaining to estimated delivery date based on the respective snapshot time and the historical shipment estimated delivery date of that historical shipment;
    for each training set of in-flight snapshots respectively corresponding to the plurality of historical shipments:
        extracting a set of input features respectively corresponding to that training set of in-flight snapshots, and
        generating a feature vector based on the set of input features;
    training a machine learning model using the feature vectors that were respectively generated for the training sets of in-flight snapshots;
    tracking shipment information for an in-progress shipment, the shipment information comprising status information and an associated estimated delivery date for the in-progress shipment, wherein the shipment information is tracked during shipment of the in-progress shipment; and
    executing the machine learning model on the shipment information for the in-progress shipment to output an inference for the in-progress shipment, the inference indicating a probability of whether delivery of the in-progress shipment will be delayed.

9. The computer-implemented method of claim 8, further comprising:
    based on a determination that the probability of whether delivery of the in-progress shipment will be delayed for the in-progress shipment exceeds a threshold, marking the in-progress shipment as being at risk of missing the associated estimated delivery date for the in-progress shipment.

10. The computer-implemented method of claim 9, further comprising storing the shipment information and the delay risk score for the in-progress shipment in a database indexed for a web application.

11. The computer-implemented method of claim 9, wherein the feature vector for each training set of in-flight snapshots comprises a current status feature and a time to estimated delivery date feature.

12. The computer-implemented method of claim 11, wherein the feature vector for each training set of in-flight snapshots includes a carrier feature.

13. The computer-implemented method of claim 12, wherein the feature vector for each training set of in-flight snapshots includes a class of service feature.

14. The computer-implemented method of claim 13, wherein the feature vector for each training set of in-flight snapshots includes a package weight feature.

* * * * *